(12) United States Patent
Erdogmus et al.

(10) Patent No.: US 7,529,651 B2
(45) Date of Patent: May 5, 2009

(54) ACCURATE LINEAR PARAMETER ESTIMATION WITH NOISY INPUTS

(75) Inventors: Deniz Erdogmus, Gainesville, FL (US); Jose Carlos Principe, Gainesville, FL (US); Yadunandana Nagaraja Rao, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 967 days.

(21) Appl. No.: 10/814,441

(22) Filed: Mar. 31, 2004

(65) Prior Publication Data

US 2005/0027494 A1 Feb. 3, 2005

Related U.S. Application Data

(60) Provisional application No. 60/459,285, filed on Mar. 31, 2003.

(51) Int. Cl.
*G06F 7/60* (2006.01)
*G06F 17/10* (2006.01)

(52) U.S. Cl. ......................................... 703/2; 381/71.12
(58) Field of Classification Search ....................... 703/2
See application file for complete search history.

(56) References Cited

U.S. PATENT DOCUMENTS

| 5,148,488 | A | 9/1992 | Chen et al. |
|---|---|---|---|
| 5,416,845 | A | 5/1995 | Qun |
| 5,623,402 | A | 4/1997 | Johnson |
| 5,742,694 | A | 4/1998 | Eatwell |
| 6,208,739 | B1 | 3/2001 | Venugopal et al. |
| 6,351,740 | B1 | 2/2002 | Rabinowitz |
| 6,463,411 | B1 | 10/2002 | Li et al. |
| 6,529,868 | B1 | 3/2003 | Chandran et al. |
| 6,590,932 | B1 * | 7/2003 | Hui et al. ..................... 375/232 |
| 6,590,976 | B1 * | 7/2003 | Lin .......................... 379/406.1 |
| 6,674,820 | B1 * | 1/2004 | Hui et al. ..................... 375/346 |
| 6,674,865 | B1 | 1/2004 | Venkatesh et al. |
| 6,697,767 | B2 | 2/2004 | Wang et al. |
| 6,741,707 | B2 * | 5/2004 | Ray et al. ................. 381/71.11 |

(Continued)

OTHER PUBLICATIONS

Douglas et al, "Self-Whitening Algorithm for Adaptive Equalization and Deconvolution", IEEE Transactions on Signal Processing vol. 47, No. 4, Apr. 1999.*

(Continued)

*Primary Examiner*—Paul L Rodriguez
*Assistant Examiner*—Mary C Jacob
(74) *Attorney, Agent, or Firm*—Thomas, Kayden, Horstemeyer & Risley

(57) ABSTRACT

A method of building a model for a physical plant in the presence of noise can include initializing the model of the physical plant, wherein the model is characterized by a parameter vector, estimating an output of the model, and computing a composite cost comprising a weighted average of an error between the estimated output from the model and an actual output of the physical plant, and a derivative of the error. The method further can include determining a step size and a model update direction. The model of the physical plant can be updated. The updating step can be dependent upon the step size. Another embodiment can include the steps of determining a Kalman gain and determining an error vector comprised of two entries weighted by a scalar parameter.

12 Claims, 3 Drawing Sheets

U.S. PATENT DOCUMENTS

2002/0046011 A1* 4/2002 Higa et al. .................. 703/2
2003/0033058 A1 2/2003 Lund

OTHER PUBLICATIONS

Rao, Y., et al., "Stochastic Error Whitening Algorithm for Linear Filter Estimation with Noisy Data", Neural Networks, vol. 16, pp. 873-880, (2003).

Rao, Y., et al., "Error Whitening Criterion for Linear Filter Estimation", Proc. of IJCNN '03, vol. 2, pp. 1447-1452, Portland, OR, (Jul. 2003).

Rao, Y., et al., "Error Whitening Criterion for Adaptive Filtering: Theory & Algorithms", Proc. of NNSP '03, pp. 309-318, Toulouse, France, (Sep. 2003).

* cited by examiner

ACCURATE LINEAR PARAMETER ESTIMATION WITH NOISY INPUTS

CROSS REFERENCE TO RELATED APPLICATIONS

This application claims the benefit of U.S. Provisional Application No. 60/459,285, filed in the United States Patent and Trademark Office on Mar. 31, 2003, the entirety of which is incorporated herein by reference.

BACKGROUND

1. Field of the Invention

The present invention relates to the field of filter adaptation and system identification in the presence of noise.

2. Description of the Related Art

System identification refers to the construction of mathematical models of a dynamic system based upon measured data. One type of mathematical model used to emulate the behavior of physical plants is the linear Autoregressive Moving Average (ARMA) model. In developing such a model, typically parameters of the model are adjusted until the output of the model coincides with that of the actual system output. The accuracy of a model can be evaluated using conventional Mean Squared Error (MSE) techniques to compare the actual system output with the predicted output of the mathematical model.

System identification is an important aspect of designing controllers for physical plants. Accurate system identification facilitates the design of robust controllers. System identification, however, can be imprecise when sensors of the physical plant being modeled collect noise in addition to data.

One conventional method of dealing with noise has been to condition a received signal in the hopes of minimizing or removing noise. Because noise and signal bands overlap in most cases, signal conditioning or filtering, at best, presents a compromise in that the noise cannot be removed from the signal bands.

Moreover, conventional MSE-based techniques are not useful indicators of model accuracy when data has been corrupted with additive white noise or noise which is similar to, or can be modeled as white noise. It has been widely acknowledged that MSE is optimal for linear filter estimation when there are no noisy perturbations on the data. For many real-world applications, however, the "noise-free" assumption is easily violated and using MSE-based methods for parameter estimation can result in severe parameter bias.

What is needed is a technique for estimating model parameters for a physical plant which provides acceptable results in the presence of noise.

SUMMARY OF THE INVENTION

The inventive arrangements disclosed herein provide a method, system, and apparatus for linear model parameter estimation in the presence of white noise, or noise that can be so approximated. Also provided is a novel criterion for performing filter adaptation. It should be appreciated that the more the actual noise in a system resembles white noise, the more accurate the results obtained from the inventive arrangements disclosed herein. The present invention further can reduce the number of parameters needed to model an unknown system when compared with mean squared error-based techniques.

One embodiment of the present invention can include a method of building a model for a physical plant in the presence of noise. The method can include initializing a model of the physical plant, wherein the model is characterized by a parameter vector, estimating an output of the model, and computing a composite cost comprising a weighted average of a squared error between the estimated output from the model and an actual output of the physical plant, and a squared derivative of the error. The method further can include determining a step size and an update direction. The model of the physical plant can be updated. Notably, the updating step can be dependent upon the step size.

Another embodiment of the present invention can include initializing a model of a physical plant and an inverse Hessian matrix, wherein the model is characterized by a parameter vector. The method also can include determining a Kalman gain, estimating the output of the model, and computing a composite cost comprising a weighted average of an error vector between the estimated output from the model and an actual output of the physical plant, and a derivative of the error. The method further can include updating the model of the physical plant and updating the inverse Hessian matrix.

Other embodiments of the present invention can include a system having means for performing the various steps disclosed herein as well as a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
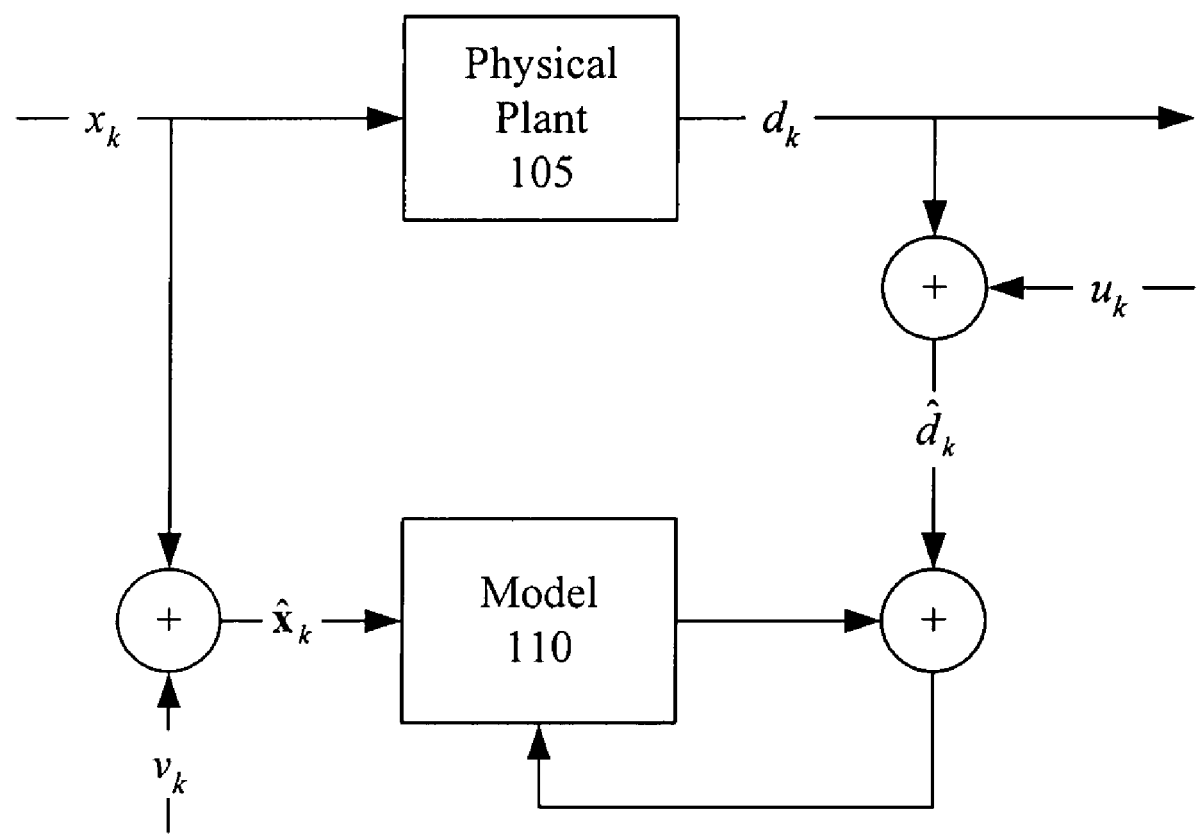
FIG. 1 is a schematic diagram illustrating a system in which embodiments of the present invention can be used.

FIG. 1 is a schematic diagram illustrating a system 100 in which embodiments of the present invention can be used. As shown, the system 100 can include a physical plant 105 and a model 110. The physical plant 105 can be any of a variety of physical machines, whether simple or complex, for which a linear model can be constructed to estimate the behavior of the physical plant 105. For example, the physical plant 105 can be a combustion engine, an assembly line, a manufacturing process, a biomedical process, or the like. The model 110 can be a linear, software-based model of the physical plant 105 that executes within a suitable information processing system.

Referring to FIG. 1, $(x_k, d_k)$ can denote the actual input and output of the physical plant 105. Measurement errors and system disturbances can be modeled as uncorrelated additive white noise sequences $u_k$ and $v_k$ having unknown variances that appear at the output and input of the physical plant 105 respectively.

System identification can be performed to build the model 110 of the physical plant 105. Given the noisy data pair $(\hat{x}_k, \hat{d}_k)$, where $\hat{x}_k \in \Re^N = x_k + v_k$ and $\hat{d}_k \in \Re^1 = d_k + u_k$, a parameter vector $w \in \Re^M$ can be determined that suitably describes the physical plant 105. Without loss of generality, the length of w can be assumed to be at least N, the number of parameters in the actual system, i.e. $M \geq N$, where M denotes the length of the parameter vector to be estimated. M also can be referred to as the model-length or the model-order. Since $d_k = x_k^T w_T$, the error can be calculated as $\hat{e}_k = x_k^T(w_T - w) + u_k - v_k^T w$.

Defining a vector $\epsilon = w_T - w$, the error autocorrelation at some arbitrary lag L can be determined using equation (1).

$$\rho_{\hat{e}}(L) = \epsilon^T E[x_k x_{k-L}^T]\epsilon + w^T E[v_k v_{k-L}^T]w \quad (1)$$

The error autocorrelation is a measure of the time structure of the error signal. The lag is a scalar value which can be chosen to measure the similarity between the error at a current time instant t and the error at time t−L. If the chosen lag, $L \geq M$ then $E[v_k v_{k-L}^T] = 0$. In that case, the error autocorrelation can be represented as equation (2).

$$\rho_{\hat{e}}(L) = \epsilon^T E[x_k x_{k-L}^T]\epsilon = (w_T - w)^T E[x_k x_{k-L}^T](w_T - w) \quad (2)$$

If the matrix $E[x_k x_{k-L}^T]$ is full rank, $\rho_{\hat{e}}(L) = 0$ only when $w = w_T$. Therefore, if the error autocorrelation at any lag $L \geq M$ is made to be zero, the estimated weight vector will be exactly equal to the true weight vector. In other words, the criterion tries to whiten the error signal for lags greater than or equal to the adaptive filter length, i.e., $\rho_{\hat{e}}(L) = 0$ for $L \geq M$. As such, the criterion can be referred to as the Error Whitening Criterion (EWC). In other words, if the error is partially whitened, the estimated model has captured the relevant information present in the input and output data. In general, a white signal carries no meaningful information. By making the error signal partially white, EWC extracts the essential information from the input/output data and captures that information within the model parameters. EWC can be represented as equation (3) below.

Defining $\hat{\hat{e}}_k = (\hat{e}_k - \hat{e}_{k-L})$, equation (1) can be rewritten as $$J(w) = E(\hat{e}_k^2) + \beta E(\hat{\hat{e}}_k^2) \quad (3)$$

where $\beta$ is a constant. Setting $\beta = -0.5$ and restricting $L \geq M$, equation (3) can be reduced to the error autocorrelation $\rho_{\hat{e}}(L)$ given by equation (2). Accordingly, a weight vector w can be found that makes $J(w) = 0$ with $\beta = -0.5$. In one embodiment, when $\beta = 0$, EWC reduces to the Mean Squared Error (MSE) cost function. The derivative of $\rho_{\hat{e}}(L)$ with respect to w can be determined by $\partial \rho_{\hat{e}}(L)/\partial w = -2[w_T - w]E[x_k x_{k-L}^T]$, and is zero when $(w_T - w) = 0$ and $E[x_k x_{k-L}^T]$ is full rank. Thus, $\rho_{\hat{e}}(L) = 0$ and $\partial \rho_{\hat{e}}(L)/\partial w = 0$ simultaneously when $w = w_T$.

Equation (4) defines a stochastic gradient update for online, local adaptation based upon EWC. This technique can be referred to as EWC-Least Mean Squares (LMS).

$$w_{k+1} = w_k + \eta \operatorname{sign}(\hat{e}_k^2 + \beta \hat{\hat{e}}_k^2)(\hat{e}_k \hat{x}_k + \beta \hat{\hat{e}}_k \hat{\hat{x}}_k) \quad (4)$$

Equation (4) includes the sign term that instantaneously changes the sign of the gradient. The expression $\operatorname{sign}(\hat{e}_k^2 + \beta \hat{\hat{e}}_k^2)$ represents an update direction. The sign term accommodates the result that the error autocorrelation at arbitrary lags can take either positive or negative values. This means that the stationary point of equation (3) can be either a global minimum, maximum, or saddle point. Equation (4) converges under the conditions listed below.

In the noisy data case, the stochastic algorithm in equation (4) with $\beta = -0.5$ converges to the stationary point $w_* = w_T$ in the mean provided that the step size $\eta$ is bound by the inequality specified in equation (5).

$$0 < \eta < \frac{2\left|E\left(\hat{e}_k^2 - 0.5\hat{\hat{e}}_k^2\right)\right|}{E\left[\left\|\hat{e}_k \hat{x}_k - 0.5\hat{\hat{e}}_k \hat{\hat{x}}_k\right\|^2\right]} \quad (5)$$

The conditions shown above are necessary for asymptotic convergence. Notably, the bound for the step-size in equation (5) can be computed in a practical and useful manner without the use of significant computing resources.

Further, with $\beta = -0.5$, the steady state $(w = w_*)$ excess error autocorrelation at lag $L \geq M$, i.e., $|\rho_{\hat{e}}(L)|$ is always bound by, $$|\rho_{\hat{e}}(L)| \leq \eta/2 E(\hat{e}_\infty^2)[Tr(R+V)] + 2\eta[\sigma_u^2 + \|w_\infty\|\|w_*\|Tr(V)] \quad (6)$$

where $R = E[x_k x_k^T]$, and $V = E[v_k v_k^T]$ and $Tr(\cdot)$ denotes the matrix trace. The noise variances in the input and desired signals are represented by $\sigma_v^2$ and $\sigma_u^2$ respectively. As such, using the stochastic technique, the misadjustment can be arbitrarily minimized by having a time varying step-size that asymptotically decays to zero.

Figure 2:
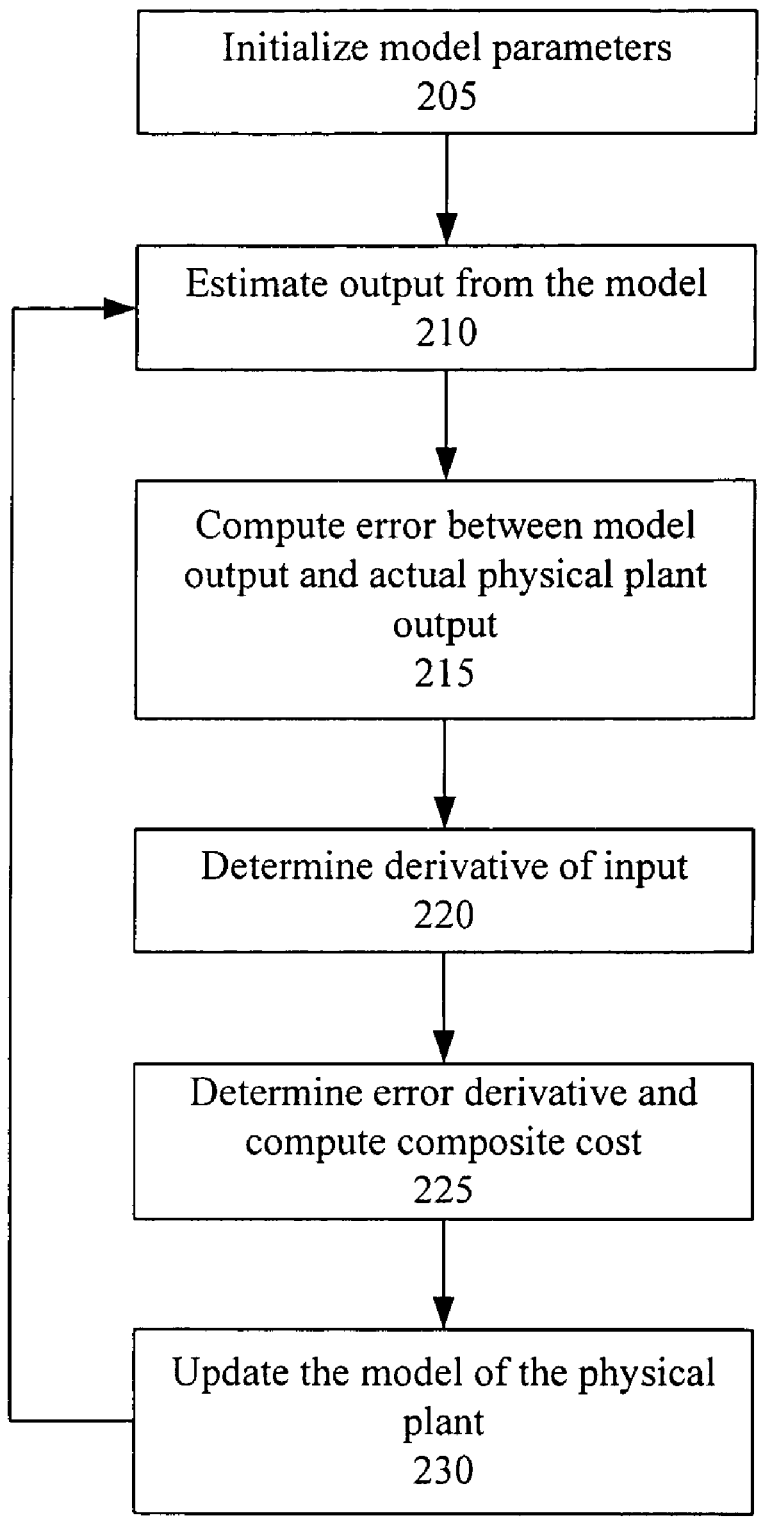
FIG. 2 is a flow chart illustrating a method of performing linear parameter estimation for a physical plant in accordance with one embodiment of the present invention.

FIG. 2 is a flow chart illustrating a method 200 of performing linear parameter estimation for a physical plant in accordance with one embodiment of the present invention. Method 200 illustrates the EWC-LMS technique described above and has a complexity of O(M), where M is the number of parameters to be estimated. The method 200 can begin in a state where a physical plant is to be modeled with a linear model. As noted, the system or physical plant being modeled can include noise.

The method can begin in step 205 wherein model parameters are initialized. In particular, a weight vector characterizing the model denoted as $w_k$ can be set equal to some initial value. In one embodiment, the weight vector can be initialized to 0. The step size $\eta$ and $\beta$ also can be initialized. While $\beta$ can be set to any of a variety of different values, in one embodiment, $\beta$ can be set equal to −0.5 or substantially equal to −0.5. Further, a lag L can be selected. As noted, the lag can be assigned a value that is greater than or equal to the number of parameters in the system including the physical plant.

In step 210, the output of the model can be computed. The output $d_k$ can be estimated according to $d_k = x_k^T w_T$. In step 215, the error between the estimated output and the actual physical plant output can be determined. The current input vector to the physical plant and the output, which typically is a scalar, can be measured. Accordingly, the error $e_k$ can be calculated according to $e_k = d_k - y_k$.

In step 220, the derivative of the input vector to the physical plant can be determined. In step 225, the derivative of the error can be calculated. Using the error and the error derivative, the composite cost can be determined. The composite cost can be calculated as a weighted average of the squared error between the estimated output of the model and the actual output of the physical plant, and the squared derivative of the error. Further the update direction also can be determined. In step 230, the model of the physical plant can be updated. That is, the model of the physical plant which is characterized by the weight vector $w_k$ can be updated according to $w_{k+1} = w_k + \eta \operatorname{sign}(\hat{e}_k^2 + \beta \hat{\hat{e}}_k^2)(\hat{e}_k \hat{x}_k + \beta \hat{\hat{e}}_k \hat{\hat{x}}_k)$.

The method 200 can loop back to step 210 to repeat as necessary until a solution is determined or the method converges.

Figure 3:
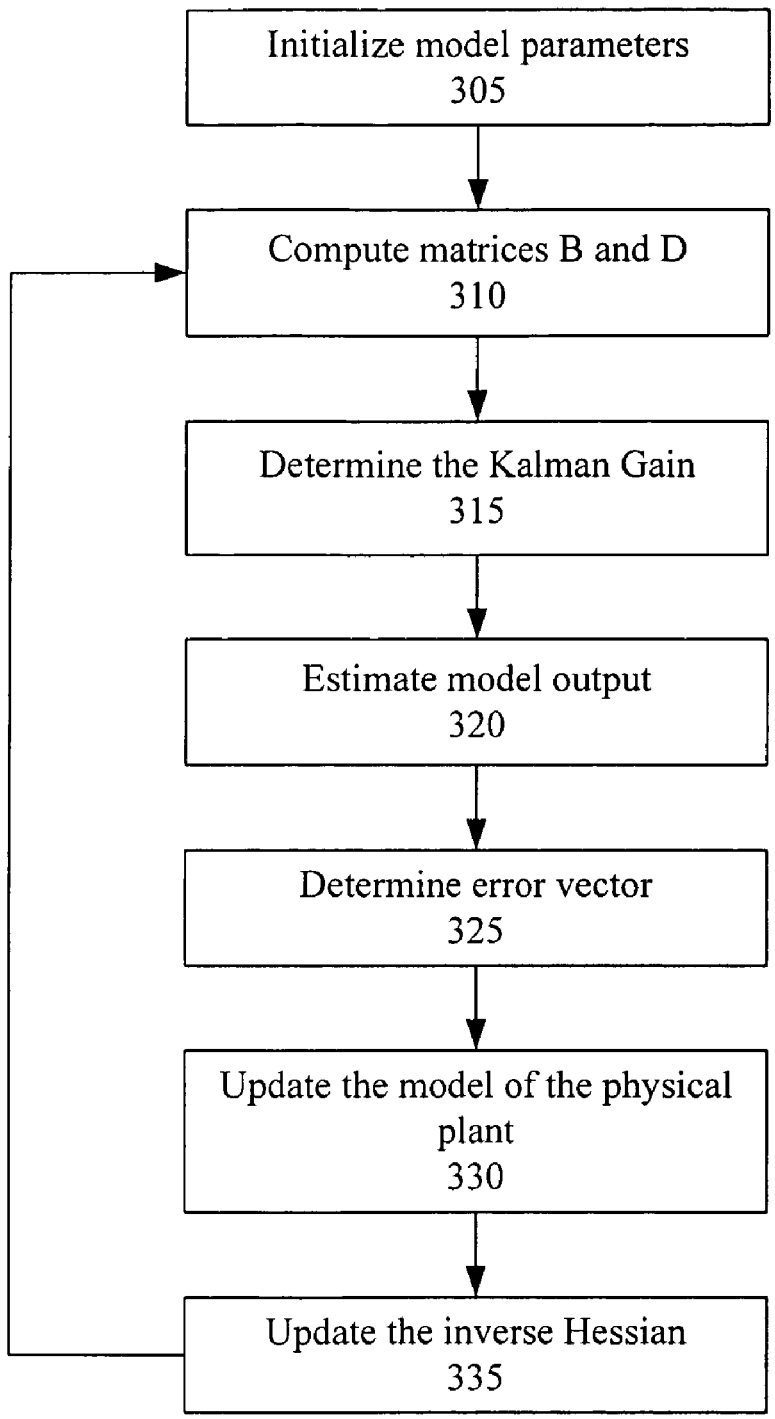
FIG. 3 is a flow chart illustrating a method of performing linear parameter estimation for a physical plant in accordance with another embodiment of the present invention.

FIG. 3 is a flow chart illustrating a method 300 of performing linear parameter estimation for a physical plant in accordance with another embodiment of the present invention. The method 300 provides a fast Quasi-Newton type recursive technique for finding the stationary point of the EWC. The complexity of this technique, referred to as the Recursive Error Whitening (REW) technique, is $O(M^2)$, where M is the number of parameters to be estimated. Though the REW technique has a higher complexity than the EWC-LMS technique described above, the REW technique is fast converging and functions independently of eigenspread and other issues associated with gradient methods.

The method 300 can begin in step 305 where the model parameters can be initialized. More particularly, $w_k$ can be initialized to some beginning value. In one embodiment, $w_k$ can be set equal to 0. Further, the inverse Hessian matrix $Z_0^{-1}$ can be initialized to cI, where c can be a large positive constant. In one embodiment, c can be set to a value between approximately 100-1,000. The matrix I denotes an identity matrix. The inverse Hessian matrix $Z_0^{-1}$ is the second derivative of the criterion with respect to the parameters w. As noted, while β can be set to any of a variety of different values, in one embodiment, β can be set equal to −0.5 or substantially equal to −0.5.

In step 310, matrices B and D can be defined. Matrix B can be defined as $[(2\beta\hat{x}_k - \beta\hat{x}_{k-L})\hat{x}_k]$ and matrix D can be defined as $[\hat{x}_k(\hat{x}_k - \beta\hat{x}_{k-L})]$. In step 315, the Kalman gain can be determined. The Kalman gain $\kappa_k$ can be calculated according to $\kappa_k = Z_{k-1}^{-1} B(I_{2\times 2} + D^T Z_{k-1}^{-1} B)^{-1}$.

In step 320, model outputs can be determined. More particularly, the output estimation $y_k$ can be obtained according to $y_k = \hat{x}_k^T w_{k-1}$ and $y_{k-L} = \hat{x}_{k-L}^T w_{k-1}$. The method 300 computes the errors at time instant k and k−L, where L is the chosen lag.

In step 325, the error vector $e_k$ can be determined according to $$e_k = \begin{bmatrix} d_k - y_k \\ d_k - y_k - \beta(d_{k-L} - y_{k-L}) \end{bmatrix} = \begin{bmatrix} e_k \\ e_k - \beta e_{k-L} \end{bmatrix}.$$

In step 330 the model of the physical plant, characterized by the weight vector $w_k$ can be updated according to $w_k = w_{k-1} + \kappa_k e_k$. In step 335, the inverse Hessian $Z_k^{-1}$ can be updated according to $Z_k^{-1} = Z_{k-1}^{-1} - \kappa_k D^T Z_{k-1}^{-1}$. The method can loop back to step 310 to repeat as necessary.

The inventive arrangements presented herein can be used within the context of system identification with noisy inputs. Noisy inputs traditionally lead to biased parameter estimates that result in poor system identification. The inventive arrangements disclosed herein provide a solution which overcomes the disadvantages of system identification techniques that rely upon optimizing the MSE criterion using techniques such as LMS and Recursive Least Squares (RLS). Techniques such as these do not guarantee unbiased model estimates in noisy conditions. The inventive arrangements disclosed herein can be used to develop accurate model estimates in the presence of noise without adding significant additional computational complexity when compared with MSE-based techniques.

The various embodiments disclosed herein estimate the optimal EWC solution. The embodiments discussed are derived from the objective function disclosed in equation (3). Once each technique converges, the same weight vector that partially whitens the error signal results.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of building a model for a physical plant in the presence of noise comprising:
    (a) initializing the model of the physical plant using an information processing system, wherein the model is characterized by a parameter vector;
    (b) estimating an output using the model;
    (c) computing an error based on an actual output of the physical plant and the estimated output
    (d) computing a composite cost based on the computed error and a cost function defined by $J(w) = E(\hat{e}_k^2) + \beta E(\hat{\mathbf{e}}_k^2)$;
    (e) determining a step-size and a model update direction; and
    (f) updating the model of the physical plant, wherein said updating step is dependent upon the step size.

2. The method of claim 1, wherein the parameter vector is represented as $w_k$, and further comprising:
    setting the parameter vector $w_k$ to an initial set of values at said step (a);
    bounding the step size η by $$0 < \eta < \frac{2\left|E(\hat{e}_k^2 - 0.5\hat{e}_k^2)\right|}{E[\|\hat{e}_k\hat{x}_k - 0.5\hat{e}_k\hat{x}_k\|]^2}$$

after step (d); and
    setting a lag value to be greater than or equal to a number of parameters in a physical system including the physical plant.

3. The method of claim 1, said step (a) further comprising setting a value of β in the cost function to be substantially equal to −0.5.

4. The method of claim 1, wherein the parameter vector is represented as $w_k$ and wherein said, step (e) further comprises updating the parameter vector according to $w_{k+1} = w_k + \eta \text{sign}(\hat{e}_k^2 + \beta\hat{\mathbf{e}}_k^2)(\hat{e}_k\hat{x}_k + \beta\hat{\mathbf{e}}_k\hat{x}_k)$.

5. A computer-based system for building a model for a physical plant in the presence of noise, the system comprising:
    an information processing system having:

(a) means for initializing the model of the physical plant, wherein the model is characterized by a parameter vector;
(b) means for estimating an output using the model;
(c) means for computing an error based on an actual output of the physical plant and the estimated output;
(d) means for computing a composite cost based on the computed error and a cost function defined by $J(w) = E(\hat{e}_k^2) + \beta E(\hat{\mathbf{e}}_k^2)$;
(e) means for determining a step size and a model direction; and
(f) means for updating the model of the physical plant, wherein operation of the updating means is dependent upon the step size.

6. The system of claim 5, wherein the parameter vector is represented as $w_k$, and further comprising:
means for setting the parameter vector $w_k$ to an initial set of values;
means for bounding the step size $\eta$ by $$0 < \eta < \frac{2\left|E\left(\hat{e}_k^2 - 0.5\hat{\mathbf{e}}_k^2\right)\right|}{E\left[\left\|\hat{e}_k\hat{x}_k - 0.5\hat{\mathbf{e}}_k\hat{\mathbf{x}}_k\right\|\right]^2};$$

and
means for setting a lag value to be greater than or equal to a number of parameters in a physical system including the physical plant.

7. The system of claim 5, said means (a) further comprising means for setting a value of $\beta$ in the cost function to be equal to $-0.5$.

8. The system of claim 5, wherein the parameter vector is represented as $w_k$, and wherein said means (e) further comprises means for updating the parameter vector according to $w_{k+1} = w_k + \eta \operatorname{sign}(\hat{e}_k^2 + \beta \hat{\mathbf{e}}_k^2)(\hat{e}_k\hat{x}_k + \beta \hat{\mathbf{e}}_k\hat{\mathbf{x}}_k)$.

9. A machine readable storage having stored thereon, a computer program having a plurality of code sections, said code sections executable by a machine for causing the machine to build a model of a physical plant in the presence of noise comprising the steps of:
(a) initializing the model of the physical plant, wherein the model is characterized by a parameter vector;
(b) estimating an output using the model;
(c) computing an error based on an actual output of the physical plant and the estimated output;
(d) computing a composite cost based on the computed error and a cost function defined by $J(w) = E(\hat{e}_k^2) + \beta E(\hat{\mathbf{e}}_k^2)$;
(e) determining a step size and a model update direction; and
(f) updating the model of the physical plant, wherein said updating step is dependent upon the step size.

10. The machine readable storage of claim 9, wherein the parameter vector is represented as $w_k$, and further comprising:
setting the parameter vector $w_k$ to an initial set of values at said step (a);
bounding the step size $\eta$ by $$0 < \eta < \frac{2\left|E\left(\hat{e}_k^2 - 0.5\hat{\mathbf{e}}_k^2\right)\right|}{E\left[\left\|\hat{e}_k\hat{x}_k - 0.5\hat{\mathbf{e}}_k\hat{\mathbf{x}}_k\right\|\right]^2}$$

and
setting a lag value to be greater than or equal to a number of parameters in the physical system.

11. The machine readable storage of claim 9, said step (a) further comprising setting a value of $\beta$ in the cost function to be substantially equal to $-0.5$.

12. The machine readable storage of claim 9, wherein the parameter vector is represented as $w_k$, and wherein said step (e) further comprises updating the parameter vector according to $w_{k+1} = w_k + \eta \operatorname{sign}(\hat{e}_k^2 + \beta \hat{\mathbf{e}}_k^2)(\hat{e}_k\hat{x}_k + \beta \hat{\mathbf{e}}_k\hat{\mathbf{x}}_k)$.

* * * * *